United States Patent [19]

Clerc et al.

[11] Patent Number: 4,957,349

[45] Date of Patent: Sep. 18, 1990

[54] ACTIVE MATRIX SCREEN FOR THE COLOR DISPLAY OF TELEVISION PICTURES, CONTROL SYSTEM AND PROCESS FOR PRODUCING SAID SCREEN

[75] Inventors: Jean-Frédéric Clerc, Saint Egreve; Jean-Claude Deutsch, Grenoble, both of France

[73] Assignee: Commissariat a l'Energie Atomique, Paris, France

[21] Appl. No.: 170,848

[22] Filed: Mar. 21, 1988

[30] Foreign Application Priority Data

Apr. 6, 1987 [FR] France ................................. 87 04820

[51] Int. Cl.⁵ .............................................. G02F 1/13
[52] U.S. Cl. ..................................... 350/333; 350/332; 350/339 F; 350/346; 350/347 R; 350/347 E
[58] Field of Search ............... 350/347 R, 347 E, 346, 350/339 F, 332, 333

[56] References Cited

U.S. PATENT DOCUMENTS

| | | | |
|---|---|---|---|
| 4,560,241 | 12/1985 | Stolov et al. | 350/339 R |
| 4,579,425 | 4/1986 | Ishii et al. | 350/346 |
| 4,610,507 | 9/1986 | Kamamori et al. | 350/339 F |
| 4,653,865 | 3/1987 | Kando et al. | 350/347 E |
| 4,697,884 | 10/1987 | Amstutz et al. | 350/346 |
| 4,701,028 | 10/1987 | Clerc et al. | 350/337 |
| 4,770,503 | 9/1988 | Buchecker et al. | 350/350 R |
| 4,795,579 | 1/1989 | Vauchier et al. | 350/350 R |
| 4,813,770 | 3/1989 | Clerc et al. | 350/347 E |

FOREIGN PATENT DOCUMENTS 1490110 10/1977 United Kingdom .

OTHER PUBLICATIONS

F. Clerc, "Electro-Optical Limits of the Electrically Controlled Birefringence Effect in Nematic Liquid Crystals," *Displays*, vol. 2, 1981, pp. 341–347.

Primary Examiner—Stanley D. Miller
Assistant Examiner—Anita Pellman Gross
Attorney, Agent, or Firm—Nilles & Nilles

[57] ABSTRACT

Active matrix screen for the color display of television images or pictures, control system and process for the production of the screen.

Figure 1:
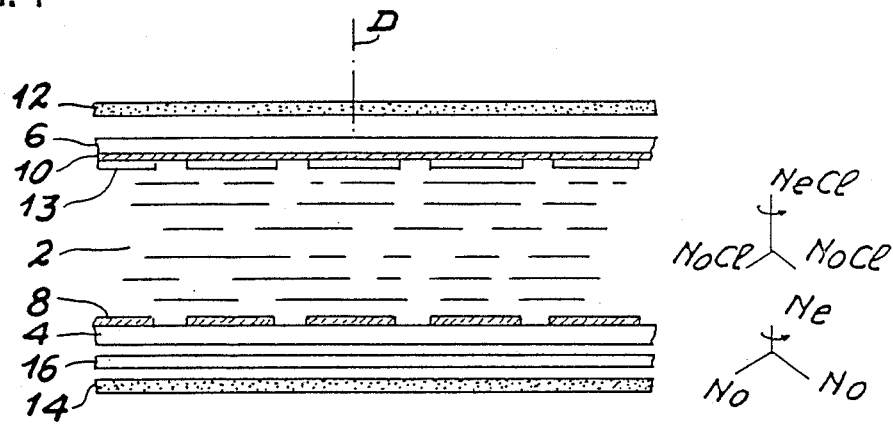

The screen utilizes the electrically controlled birefringence effect and comprises an assembly having a nematic liquid crystal layer (2) with a positive optical anisotropy between an active matrix having transparent control electrodes (8) and a transparent counterelectrode (10) equipped with colored filters (13) and two polarizing means (12,14), which are complimentary of one another and are located on either side of the assembly. The optical path in the layer is at the most equal to approximately 0.6 micrometer. The system comprises means for amplifying the blue, green and red video signals, whereof the respective gains are regulated so as to be able to display a neutral white shade. According to the process, it is possible to produce between one of the polarizing means and the assembly, a birefringence compensating layer (16) essentially corresponding to the same optical path as the liquid crystal layer. (FIG. 1).

8 Claims, 3 Drawing Sheets

ACTIVE MATRIX SCREEN FOR THE COLOR DISPLAY OF TELEVISION PICTURES, CONTROL SYSTEM AND PROCESS FOR PRODUCING SAID SCREEN

DESCRIPTION

The present invention relates to an active matrix screen for the colour display of television images or pictures, as well as to a control system and a process for producing such a screen.

An active matrix screen for the colour display of television pictures is also known. This screen, which is used by Seiko-Epson for the manufacture of pocket television sets comprises an assembly having a liquid crystal layer between an active matrix having transparent control electrodes and a transparent counter electrode provided with coloured filters respectively associated with the control electrodes and two uncrossed rectilinear polarizers on either side of said assembly. This screen uses the so-called twisted nematic effect and the liquid crystal layer has a constant thickness.

This known screen suffers from the disadvantage that extinction in the inoperative state is only obtained in the vicinity of a particular optical wavelength. Thus, throughout the visible spectrum there is a strong residual transmission and in particular in trichromatic display an unpleasant colouring of the dark state and a reduced purity of the colours in the bright state.

Moreover, due to the twisted nematic effect, there is a reduced viewing angle in the north-south directions of the screen (vertical directions of the screen) and grey levels which are highly dependent on the observation angle not only in all north-south directions, but also in east-west directions (horizontal directions of the screen).

Another active matrix screen for the colour display of television pictures is known. This screen, which is used by Matsushita for the manufacture of pocket televisions, differs from the aforementioned screen through the thickness of the liquid crystal layer no longer being constant and instead being adapted to the coloured filters in front of which it is located. The greatest thickness corresponds to the red filters, the minimum thickness to the blue filters and there is an intermediate thickness in front of the green filters.

This makes it possible to reduce the parasitic transmission of the dark state and to increase the purity of the colours. However, the dark state of said known screen remains coloured and the aforementioned disadvantages resulting from the helical nematic effect remain.

Moreover, the manufacture of said other known screen is complicated by the fact that it requires the obtaining of three different liquid crystal thickness (one thickness for each colour red blue and green).

The present invention relates to an active matrix screen for the colour display of television pictures or images which, whilst obviating the manufacturing complexity disadvantage, makes it possible to obtain a total extinction in the inoperative state of the screen and for the entire visible spectrum.

More specifically, the present invention relates to an active matrix screen for the colour display of television pictures, said screen comprising an assembly having a liquid crystal layer of a substantially constant thickness and comprised between an active matrix having transparent control electrodes and a transparent counterelectrode provided with coloured filters, respectively associated with the control electrodes and two polarizing means on either side of said assembly, said screen being characterized in that it utilizes the electrically controlled birefringence effect, the liquid crystal layer being of the nematic type and having a positive optical anisotropy, the molecules of said layer being essentially oriented in accordance with a homeotropy direction, in the absence of an electrical voltage between the electrodes and the counterelectrode, in that the product of the thickness of the liquid crystal layer by the NeCL−NoCL difference between the extraordinary index and the ordinary index of said layer is at the most equal to approximately 0.6 micrometer and in that the two polarizing means are complimentary of one another.

The construction of an active matrix screen using the electrically controlled birefringence effect for the colour display of television images is original. It is the use of this effect which makes it possible to obtain a total extinction in the inoperative state of the screen and for the complete visible spectrum.

The present invention also overcomes the prejudice according to which the use of the electrically controlled birefringence effect necessitates the use of a liquid crystal layer leading to a long optical path (i.e. a high value for the product of the thickness of the liquid crystal layer by the difference NeCL−NoCL between the extraordInary index and the ordinary index of said layer), whereby in the invention said optical path is small, i.e. at the most equal to approximately 0.6 micrometer.

In this connection, it is pointed out that this length of approximately 0.6 micrometer corresponds to the upper limit (in wavelength) of the visible spectrum.

In the present invention, the use of a liquid crystal layer leading to a small optical path permits an increase in the viewing angle for the screen according to the invention compared with a known screen using the electrically controlled birefringence effect and for which said viewing angle does not exceed 2° (with respect to the normal to the screen, which passes through the centre thereof).

Furthermore, in the screen according to the invention, the thickness of the liquid crystal layer is substantially constant, which facilitates production of said screen.

Said active matrix can comprise thin film transistors.

Preferably, the screen according to the invention also comprises at least one layer of a birefringence compensating medium, constituted by a uniaxial medium of negative optical anistropy having an axis of symmetry parallel to the homeotropy direction and an extraordinary axis parallel to said axis of symmetry, the product of the total thickness of the medium in said screen by the difference No−Ne between the ordinary index and the extraordinary index of said medium being substantially equal to the product of the thickness of the liquid crystal layer by the difference NeCL−NoCL between the extraordinary index and the ordinary index of said layer.

The use of such a layer of a birefringence compensating medium makes it possible to increase the viewing angle in the north-south directions of the screen and obtain good grey levels, substantially independent of the observation angle, in all north-south and east-west directions, as well as a high contrast, which can reach or exceed 200/1.

The screen according to the invention is advantageously compatible with any polarizing means (rectilinear, circular or eliptical). It is pointed out in this connection that the term "polarizing means which are complementary of one another" means e.g. two crossed rectilinear polarizers, or two circular or eliptical polarizers complementary of one another with respect to an incident plane light wave propagating in the homeotropy direction, or more briefly respectively to the left and right of said wave.

Preferably, the liquid crystal also has a dielectric anisotropy at least equal to approximately −4. This makes it possible to advantageously reduce the flicker observed on active matrix-controlled screens.

In an improved realization of the invention, the liquid crystal is also chosen in such a way that the ratio of its elastic flexion constant to its elastic fan constant exceeds approximately 1.1. This makes it possible to even further reduce said flicker.

The present invention also relates to a control system for the screen according to the invention, said system incorporating means for amplifying respectively the blue, green and red chrominance signals provided for the formation of pictures, said system being characterized in that each amplification means is provided with an amplification gain regulation, which is to be regulated so as to be able to display a neutral white shade on the screen.

Preferably, the relative gains with respect to the blue, red and green signals respectively only differ slightly from (VmB/Vs)−1, (VmR/Vs)−1 and (VmV/Vs)−1 in which Vs represents the threshold voltage for the illumination of the screen and VmB, VmR and VmV respectively represent the relative saturation voltages to blue, red and green.

Finally, the present invention also relates to a process for the manufacture of an active matrix screen for the colour display of television pictures, characterized in that it comprises the following successive stages:

a first planar, transparent substrate is produced having on one face an active matrix with the transparent control electrode;

a second planar, transparent substrate is produced having on one face a transparent counterelectrode provided with coloured filters for respective association with the control electrodes;

said screen being intended for utilizing the electrically controlled birefringence effect and for containing a nematic liquid crystal layer with positive optical anisotropy between said respective faces of said substrate rendered parallel, a treatment of one of the faces taking place, so that the molecules of the liquid crystal layer, once the latter has been placed between the parallel faces, are substantially oriented in a direction perpendicular to said faces in the absence of a voltage between the electrodes and the counterelectrode.

the substrates are fixed to one another, so that said faces face one another and are parallel and by providing between said faces a gap such that the product of the width of said gap by the difference NeCL−NoCL between the extraordinary index and the ordinary index of the liquid crystal layer is at the most equal to approximately 0.6 micrometer;

on either side of the substrate are fixed two polarizing means which are complimentary of one another, the fixing of at least one of these means being obtained by disposing between said means and the adjacent substrate at least one layer of a thermoplastic polymer material, by subjecting the two sides of the assembly of the substrates and said polarizing means to a uniform pressure, by effecting a heating of said assembly maintained in the pressure state until each material layer passes from its vitreous phase into its isotropic phase, by stopping the heating and by eliminating the pressure, the thickness of each material layer being chosen in such a way that the product of the total material thickness by the difference No−Ne between the ordinary index and the extraordinary index of said material is substantially equal to the product of the thickness of the liquid crystal layer by the difference NeCL−NoCL between the extraordinary index and the ordinary index of said layer and the latter is introduced between said faces.

Preferably, to further improve the grey levels obtained with the screen according to the invention, said treatment is also provided for obtaining a pre-tilt of at least 1° in the vicinity of said faces.

The present invention will be better understood from reading the following description of non-limitative embodiments and with reference to the attached drawings, wherein show:

FIG. 1 a diagrammatic, partial sectional view of a particular embodiment of the screen according to the invention.

Figure 2:
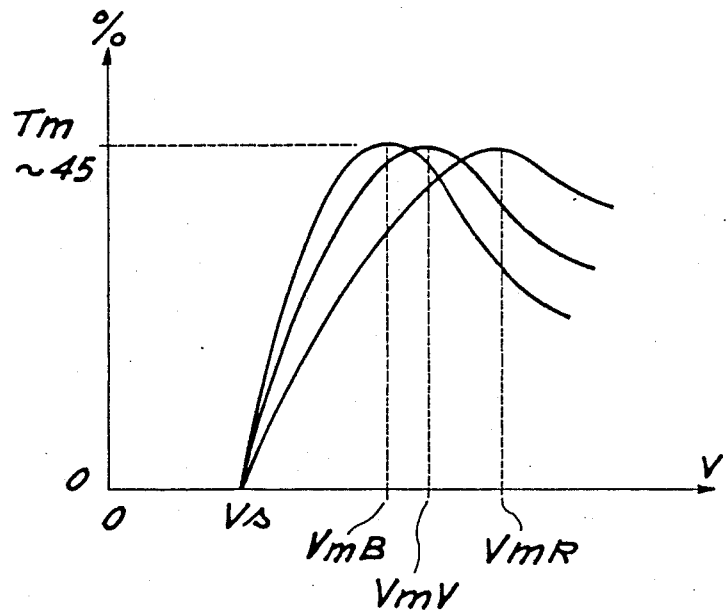

FIG. 2 a graph showing the obtention, with said screen, of saturation voltages relative to blue, red and green of different levels.

Figure 3:
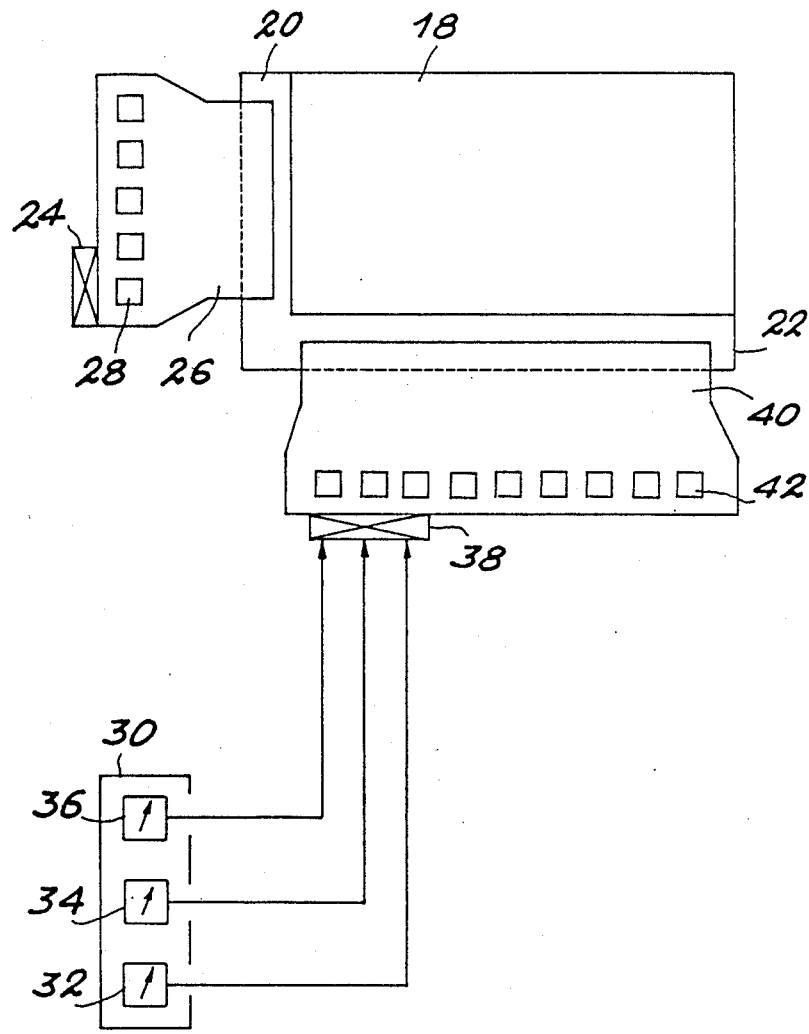

FIG. 3 a diagrammatic view of a particular embodiment of the control system according to the invention used for controlling a screen according to the invention.

Figure 4:
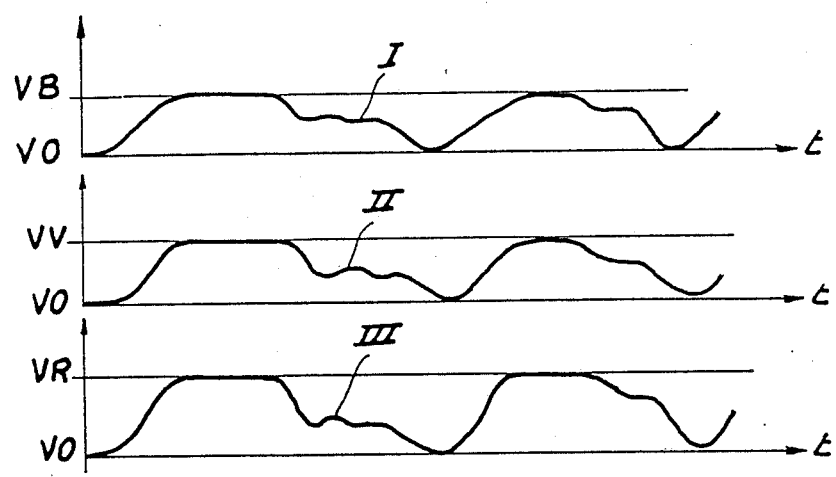

FIG. 4 the time evolution which can be obtained in the invention for the blue, green and red video signals produced by the control system.

Figure 5:
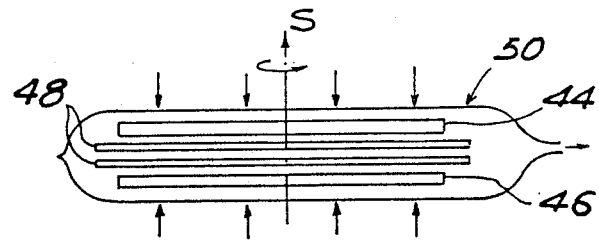

FIG. 5 diagrammatically a process making it possible to produce a layer of a uniaxial medium of negative optical anisotropy usable in the invention.

Figure 6:
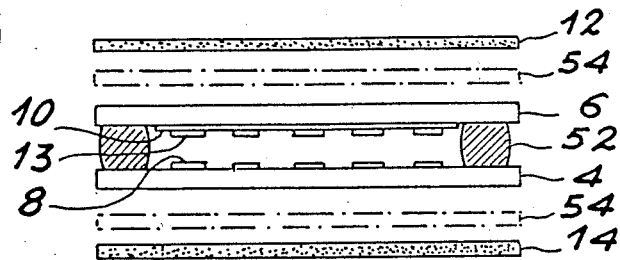

FIG. 6 a diagrammatic exploded view of a screen according to the invention, illustrating the integration of the production of several layers of the uniaxial medium of negative optical anisotropy used in said screen at the stage of sealing the same.

FIG. 1 diagrammatically shows a particular embodiment of the active matrix screen for the colour display of television pictures or images according to the invention. The screen comprises a liquid crystal layer 2 between a lower plate 4 and an upper plate 6, which are parallel and transparent and are e.g. of glass. Transparent electrodes are respectively placed on the faces of plates 4 and 6, which directly face one another. More specifically, the lower plate 4 carries, on one face, an active matrix having transparent control electrodes 8 respectively associated with not shown, thin film, field effect transistors. The upper plate 6 carries on one face facing the control electrodes, a transparent counterelectrode 10 provided with coloured filters 13 (blue, red and green), which are respectively placed facing the control electrodes. The counterelectrode and the control electrodes are e.g. made from indium oxide films.

A first and a second crossed rectilinear polarizer 12 and 14 surround the assembly constituted by layer 2 and the two plates 4 and 6. The first polarizer 12 is located on the side of plate 6 and the second polarizer 14 on the side of plate 4. The screen is to be illuminated by light striking the first polarizer 12 and observed through the second polarizer 14. These two polarizers are in the form of plates parallel to plates 4 and 6.

The screen also comprises a sheet 16 of a compensating medium, which is positioned between the lower plate 4 and the second polarizer 14, parallel to the latter and on which information will be given hereinafter.

The liquid crystal layer used is a nematic liquid crystal layer, whose molecules are substantially oriented in accordance with a direction D perpendicular to plates 4 and 6, called the homeotropy direction, in the absence of a voltage between the electrodes and the counterelectrode. This nematic liquid crystal layer is a uniaxial medium of positive optical anisotropy, the extraordinary index NeCl of said medium exceeding its ordinary index NoCL. The ellipsoid of the indexes or indices of this medium has an axis of symmetry, which is the strongest index axis (NeCL in the present case) and which is parallel to the major axes of the liquid crystal molecules, as well as to the homeotropy direction, in the absence of a voltage between the electrodes and the counterelectrode.

The compensating sheet 16 is a uniaxial medium of negative optical anisotropy, the extraordinary index Ne of said medium being below its ordinary index No. The ellipsoid of the indexes of this medium has an axis of symmetry, which is the weak index axis (Ne in the present case) and which is parallel to the homeotropy direction.

The liquid crystal layer also has a strong pre-tilt in the vicinity of the walls of the plates between which it is located. A way of obtaining this strong pre-tilt will be given hereinafter.

Moreover, the liquid crystal layer is produced in such a way as to have a limited "optical thickness", i.e. in such a way that the product of its substantially constant thickness e by the difference NeCL−NoCL is small and below 0.6 micrometer.

The optical compensating sheet 16 is chosen so as to have an optical thickness substantially equal to that of the liquid crystal layer, i.e. a product (No−Ne).ec substantially equal to (NeCL−NoCL).e, in which ec represents the thickness of sheet 16.

In a purely indicative and non-limitative manner, thickness e is taken equal to approximately 4 micrometers, the quantity NeCl−NoCL to approximately 0.08, the liquid crystal being of the type marketed by Merck under the reference C.C.N and the compensating sheet 16 is obtained by the treatment of a thermoplastic polymer marketed by Dupont de Nemours under the trademark Surlyn and with a thickness of approximately 200 to 300 micrometers. The treatment of the thermoplastic polymer will be defined hereinafter.

Sheet 16 could be positioned between plate 6 and polarizer 12 instead of being positioned between plate 4 and polarizer 14.

More generally, it is possible to replace sheet 16 by a plurality of layers of the same type disposed in some cases between plate 6 and polarizer 12 and in others between plate 4 and polarizer 14, the total thickness of these layers being equal to the predetermined thickness of sheet 16.

The electrooptical response of the screen shown in FIG. 1, equipped with crossed rectilinear polarizers 12 and 14, is indicated in FIG. 2, which gives the relative transmission of the screen (as a percentage) as a function of the voltage V (expressed in volts) applied between the electrodes and the counterelectrode. In the inoperative state (zero voltage between the electrodes and counterelectrode) all the (optical) wavelengths are completely extinguished. The threshold voltage Vs corresponding to the illumination is the same for all wavelengths. However, the saturation voltage, corresponding to a maximum relative transmission Tm of approximately 45% of the transparency of the screen without polarizer, is dependent on the wavelength and therefore assumes different values for the colours blue, red and green.

In FIG. 2, the saturation voltages respectively associated with blue, red and green are respectively designated VmB, VmR and VmV and VmR exceeds VmV, which exceeds VmB.

In a purely indicative and non-limitative manner and whilst using an approximately 4 micrometer thick liquid crystal layer of the material marketed by Merck under the reference ZLI 2659, the quantities Vs, VmB and VmR are respectively equal to 2 V, 4 V and 5.5 V.

The fact that the saturation voltages for the colours blue, red and green are different is prejudicial to the display of a neutral white shade on the screen according to the invention. To obviate this disadvantage, use is made for the purpose of controlling said screen of a control system which is known in the art for the control of active matrix screens and said system is appropriately adapted. More specifically, in the latter is provided an amplification gain regulation for each of the means respectively provided for the amplification of the blue, red and green chrominance signals.

This will become more apparent from the description of FIG. 3, which diagrammatically and partially shows a control system for a screen 18 according to the invention, e.g. of the type shown in FIG. 1.

This active matrix screen consequently comprises a system of line contacts 20 and a system of column contacts 22. In known manner, the control system comprises line signal input means 24 having not shown electrical supply and synchronization means and connected to the line contacts 20 via a flexible circuit 26, equipped with integrated circuits 28 for shaping the line signals.

Also in known manner, the control system also comprises a video signal source 30, e.g. of the screen controller type, equipped with amplification means 32,34,36 respectively provided for amplifying the previously demodulated blue, red and green video signals or chrominance signals.

In known manner, the control system also comprises means 38 for the inputing of the blue, red and green video signals constituting the column signals, said means 38 being provided with not shown electric supply and synchronization means and are connected to the column contacts 22 via a flexible circuit 40 equipped with integrated circuits 42 provided for the shaping of the video signals. The integrated circuits 28 and 42 are e.g. drivers of the type marketed under references 5280 and 5281 by the OKI company.

According to the present invention, this known control system is modified in the following way. The fixed gain, video signal amplification means therein are replaced by regulatable gain amplification means. In addition, each of the amplification stages or means 32,34 and 36 is provided with an amplification gain regulation or control (which is symbolized by arrows on means 32,34 and 36) and each of these gains is regulated so as to be able to display a neutral white shade on the screen.

This separate adjustment of the amplification gains is illustrated in FIG. 4, which shows the evolution as a function of time t of the amplitudes of the blue (curve I) green (curve II) and red (curve III) video signals, amplified with the desired gains for an even frame (positive signals) of a black and white image with grey, said image being formed on a colour screen like screen 18 (FIG. 3). The amplitudes of the blue, green and red video signals respectively vary from a minimum value VO, common to the three signals, to maximum values VB, VV, and VR.

In the case of said black and white image with grey, the gains GB, GV and GR respectively corresponding to the blue, green and red video signals are regulated, said gains being respectively $(VB/VO)-1$, $(VV/VO)-1$ and $(VR/VO)-1$, so that said gains are respectively substantially equal to $(VmB/Vs)-1$, $(VmV/Vs)-1$ and $(VmR/Vs)-1$, VR exceeding VV, which itself exceeds VB.

The present invention also seeks to reduce the flicker of the operating screen. This flicker is largely due to the electrical conductivity of the liquid crystal and to the capacitance variation of each elementary point (electrode associated with a coloured filter) between the black state and the coloured state of said point.

The use of the electrically controlled birefringence effect makes it possible to use slightly negative dielectric anisotropy materials, said anisotropy at least equal to $-4$, which is the case of the material marketed by Merck under reference ZLI 2659 and which is usable in the present invention. Thus, materials exist with a very low conductivity and which lead to a limited variation between the capacitance of the elementary points in the coloured state and that of said points in the black state. Thus, two main causes of flicker are eliminated. Despite the very low value of the dielectric anisotropy in question, it is possible to use low voltages of less than 10 V for controlling the screens according to the invention and provided with a liquid crystal layer having said dielectric anisotropy.

Flicker is further reduced by choosing a liquid crystal which also has a high ratio of the elastic flexion K33 and fan K11 constants, which exceeds approximately 1.1, which is also the case with the material marketed by Merck under reference ZLI 2659.

FIG. 5 diagrammatically illustrates a process for the production of a uniaxial medium with negative optical anisotropy having an axis of symmetry perpendicular to said layer, the smallest index axis of said layer being parallel to said axis of symmetry. Such a layer is usable in the production of the screen shown in FIG. 1.

According to the process, between two rigid, flat, transparent substrates 44 and 46 are placed one or more sheets 48 of an appropriate total thickness of a thermoplastic material, e.g. of the type marketed by Dupont de Nemours under the trademark Surlyn. At ambient temperature, such a material is in the vitreous state, but has a birefringence dependent on its past history. By heating to an appropriate temperature, the material passes from the vitreous to the isotropic state, in which it no longer has birefringence.

Substrates 44 and 46 are e.g. two glass plates, like plates 4 and 6 used in the screen described with reference to FIG. 1.

With the sheet or sheets placed between the substrates, a uniform pressure is applied to each of the substrates (normal thereto). For this purpose, it is possible to introduce the assembly constituted by the sheet or sheets and the substrates into a plastic bag 50, which can also be stoved for a reason given hereinafter and then a vacuum is formed in said bag, which is thermally sealed. A uniform pressure equal to atmospheric pressure is then applied to each substrate.

The bag containing the assembly in question is then heated e.g. in an oven or stove until the thermoplastic material reaches its transition point vitreous state-isotropic state (known for a given material), after which the bag is removed from the oven and opened.

The material cools and then retracts. This retraction can only take place in a single direction perpendicular to the two substrates. Thus, an axis of symmetry S appears perpendicular to said direction in the material which, on reassuming its vitreous state, again passes into the birefringence state. Thus, a layer of a uniaxial medium with a negative optical anisotropy is obtained, whose axis of symmetry is perpendicular to said layer and carries the extraordinary axis of the medium.

The process described hereinbefore relative to FIG. 5 is directly and advantageously integrated into a process for the production of a screen according to the invention and more specifically into the stage of sealing said screen, sealing taking place hot and under pressure (prior to the introduction of the liquid crystal into the screen).

FIG. 6 illustrates this integration. The aim is to produce a a screen like that shown in FIG. 1, in which the sheet 16 formed by a thermoplastic polymer is replaced in the screen shown in FIG. 6 by two layers 54 of the same nature as sheet 16, but whereof the sum of the thicknesses is equal to that of sheet 16.

More specifically, the screen is produced in the following way. Firstly the plate 4 with its active matrix and plate 6 with its counterelectrode and coloured filters are formed. This is followed by a two-stage treatment on the faces of these plates, which are intended to face one another when the two plates are assembled. The first stage is intended to obtain in known manner, the alignment of the liquid crystal molecules (to be subsequently located between the two substrates) in the homeotropy direction perpendicular to the plates. The second stage aims at obtaining a strong pre-tilt of the liquid crystal in the vicinity of the plates.

For this purpose, it is possible to use a method described in French patent application No. 8417794 of 22.11.1984. Thus, to obtain a strong pre-tilt at least equal to 1°, in the vicinity of the faces of plates 4 and 6 which are to face one another when the screen is assembled, it is possible to deposit by radio frequency sputtering under a voltage of 1 kV and in an appropriate deposition apparatus, by passing each of the plates through it, e.g. a 100 nanometer thick silica coating, followed by a surface adsorption of long chain polysilanes, e.g. of the type of material marketed by Petrarch under reference ODS-E.

When this has been done, the two plates are joined to one another by sealing means 52, a appropriate gap being formed (in known manner) between the two plates with a view to the subsequent introduction between them of the liquid crystal layer. Between each of the polarizers and the adjacent plate is then placed an appropriate thickness of thermoplastic polymer sheets intended for the formation of layers 54.

Plate 4 and polarizer 14, as well as plate 6 and polarizer 12 then serve as the substrates 44 and 46 referred to in connection with FIG. 5.

More specifically, the assembly constituted by plates 4 and 6 rendered integral with one another, polarizers 12 and 14 and thermoplastic polymer sheets intended for the formation of layers 54, said sheets being placed between the polarizers and the corresponding plates, is introduced into a stovable plastic bag, the vacuum being formed in the latter and the latter is then introduced into a stove or oven. When the thermoplastic material reaches its transition point, the bag is removed from the oven and opened. As hereinbefore, during the following cooling, the sheets bonded to one another by stoving become a single layer 54 of a uniaxial medium of negative optical anisotropy having an axis of symmetry perpendicular to said layer and carrying the extraordinary axis of the medium.

Moreover, as a result of the heating and pressure, the thus obtained layer makes it possible to bond together plate 4 and polarizer 14, as well as plate 6 and polarizer 12 (said polarizers being made from a material suitable for said bonding).

In a purely indicative and non-limitative manner, for a Surlyn-type material, the uniform pressure applied is approximately $10^5$ pa to $2.10^5$ Pa and heating is carried out at a temperature of at least equal to 100° C., the transition point of said material being approximately 90° C.

This leads to the assembled screen, the liquid crystal layer being introduced between substrates 4 and 6.

We claim:

1. Active matrix screen for the color display of television pictures, said screen comprising: an assembly having a liquid crystal layer of a substantially constant thickness and disposed between an active matrix having transparent control electrodes and a transparent counterelectrode provided with colored filters, respectively associated with the control electrodes and two polarizing means on either side of said assembly, wherein said screen utilizes the electrically controlled birefringence effect, the liquid crystal layer being of the nematic type and having a positive optical anisotropy and a negative dielectric anisotropy, the molecules of said layer being substantially oriented in a homeotropy direction, in the absence of an electrical voltage between the control electrodes and the counterelectrode, wherein the product of the thickness of the liquid crystal layer by the NeCL−NoCL difference between the extraordinary index and the ordinary index of said layer is at the most equal to approximately 0.6 micrometer and wherein the two polarizing means are complementary to one another.

2. Screen according to claim 1, wherein said screen also comprises at least one layer of a birefringence compensating medium constituted by a uniaxial medium of negative optical anisotropy having an axis of symmetry parallel to the homeotropy direction and an extraordinary axis parallel to said axis of symmetry, the product of the total thickness of the medium in said screen by the difference No−Ne between the ordinary index and the extraordinary index of said medium being substantially equal to the product of the thickness of the liquid crystal layer by the difference NeCL−NoCL between the extraordinary index and the ordinary index of said layer.

3. Screen according to claim 1, wherein the liquid crystal also has a dielectric anisotropy at least equal to approximately −4.

4. Screen according to claim 3, wherein in the liquid crystal the ratio of its elastic flexion constant to its elastic fan constant exceeds approximately 1.1.

5. In combination:
active matrix screen for the color display of television pictures, said screen comprising: an assembly having a liquid crystal layer of a substantially constant thickness and disposed between an active matrix having transparent control electrodes and a transparent counterelectrode provided with coloured filters, respectively associated with the control electrodes and two polarizing means on either side of said assembly, wherein said screen utilizes the electrically controlled birefringence effect, the liquid crystal layer being of the nematic type and having a positive optical anistropy and a negative dielectric anisotropy, the molecules of said layer being substantially oriented in a homeotropy direction, in the absence of an electrical voltage between the control electrodes and the counterelectrode, wherein the product of the thickness of the liquid crystal layer by the NeCL−NoCL difference between the extraordinary index and ordinary index of said layer is at the most equal to approximately 0.6 micrometer and wherein the two polarizing means are complementary to one another;
and a control system for the control of said screen, said system incorporating amplification means for respectively amplifying blue, green and red chrominance signals provided for the formation of said pictures, each amplification means being provided with an amplification gain regulation or control, which is regulatable so as to effect a display of neutral white shade on the screen.

6. Combination according to claim 5, wherein the gains corresponding to the blue, red and green signals are respectively only slightly different from (VmB/Vs)−1, (VmR/Vs)−1 and (VmV/Vs)−1 in which Vs represents the illumination threshold voltage of screen and VmB, VmR and VmV respectively represent the saturation voltages corresponding to the blue, red and green colours.

7. Process for the manufacture of an active matrix screen for the colour display of television pictures comprising the following successive steps:
a first planar, transparent substrate is produced, said first substrate comprising on one face an active matrix having transparent control electrodes;
a second planar, transparent substrate is produced, said second substrate comprising on one face a transparent counterelectrode provided with coloured filters for respective associated with control electrodes;
said screen being intended for utilizing the electrically controlled birefringence effect and for containing a nematic liquid crystal layer with a positive optical anisotropy and a negative dielectric anisotropy between said respective faces of said substrates, said faces being rendered parallel, a treatment of the faces is carried out so that the molecules of the liquid crystal layer, once the latter has been placed between the parallel faces, are substantially oriented in a direction perpendicular to said faces in the absence of a voltage between the electrodes and the counterelectrode;
the substrates are fixed to one another, so that said faces face one another and are parallel and by providing between said faces a gap such that the product of the width of said gap by the difference NeCL−NoCL between the extraordinary index and the ordinary index of the liquid crystal layer is at the most equal to approximately 0.6 micrometer; on either side of the substrates are fixed two polarizing means which are complementary to one another, the fixing of at least one of these polarizing means being obtained by disposing between at least one of said polarizing means and the adjacent substrate at least one layer of a thermoplastic polymer material, by subjecting the two sides of the assembly of the substrates and of said at least one of said polarizing means to a uniform pressure, by effecting a heating of said assembly maintained in the pressure state until each material layer passes from its vitreous phase into its isotropic phase, by stopping the heating and eliminating the pressure, the thickness of each material layer being chosen in such a way that the product of the total material thickness by the difference No−Ne between the ordinary index and the extraordinary index of said material is substantially equal to the product of the thickness of the liquid crystal layer by the difference NeCL−NoCL between the extraordinary index and the ordinary index of said layer and the latter is introduced between said faces.

8. Process according to claim 7, wherein said treatment is also provided for obtaining a pre-tilt of at least 1° in the vicinity of said faces.

* * * * *